United States Patent
Lehment et al.

[11] 3,718,642
[45] Feb. 27, 1973

[54] PROCESS FOR THE QUATERNIZATION OF BASIC DYESTUFFS

[75] Inventors: Klaus-Friedrich Lehment, Union, N.J.; Roderich Raue, Leverkusen, Germany

[73] Assignee: Farbenfabriken Bayer Aktiengesellschaft, Leverkusen, Germany

[22] Filed: June 25, 1969

[21] Appl. No.: 836,635

[30] Foreign Application Priority Data

July 3, 1968 Germany..................P 17 70 782.3

[52] U.S. Cl. ................260/165, 260/154, 260/208
[51] Int. Cl. ..........................C09b 43/00, D06p 3/76
[58] Field of Search.............260/154, 165, 146, 157

[56] References Cited

FOREIGN PATENTS OR APPLICATIONS 1,132,135   6/1962   Germany
1,205,638   11/1965  Germany

*Primary Examiner*—Floyd D. Higel
*Attorney*—Plumley & Tyner

[57] ABSTRACT

Process for the production of basic dyestuffs of the formula

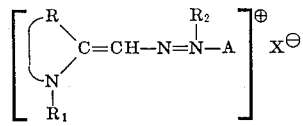

by quaternizing dye bases of the formula

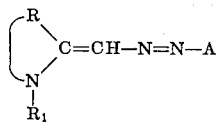

in the presence of alkaline agents wherein the improvement comprises adding as alkaline agents tertiary amines which are space occupying substituted on the nitrogen atom. In the formulas given R represents the residual constituent of a 5- or 6-membered heterocyclic ring; $R_1$ and $R_2$ are alkyl, cycloalkyl or aralkyl and $R_1$ can additionally be aryl; A is an aromatic or heterocyclic radical and X is an anion. The compounds are used as basic dyestuffs.

5 Claims, No Drawings

PROCESS FOR THE QUATERNIZATION OF BASIC DYESTUFFS

From French Pat. specification No. 1,214,896 a process is known for the production of basic dyestuffs of the general formula (I)

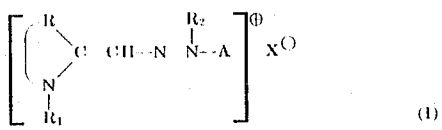

in which R represents the residual constituent of a 5- or 6-membered heterocyclic ring, $R_1$ denotes an alkyl, cycloalkyl, aralkyl or aryl radical, $R_2$ denotes an alkyl, cycloalkyl or aralkyl radical, A represents an aromatic or heterocyclic radical, and X denotes an acid radical.

This process is characterized by reacting dye bases of the general formula (II)

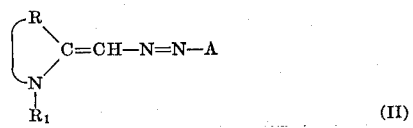

in which R, $R_1$ and A have the meaning given in formula (I), with alkylating agents while quaternizing the azo nitrogen linked with the radical A.

The above-mentioned dye bases are prepared by coupling in known manner diazotized amines of the general formula (IV) with methylene bases of the general formula (III) and converting the resultant dye salts of the general formula (V) with aqueous alkalies into the dye bases (II):

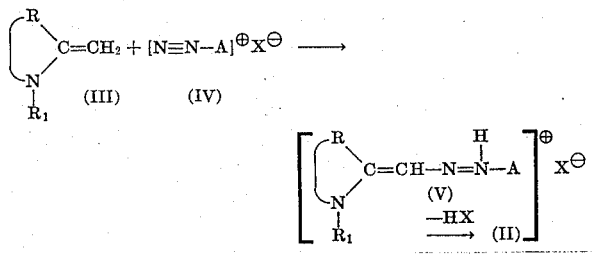

In the formulas (III), (IV) and (V) R, $R_1$, A and X have the same meaning as that given in formula (I).

A large number of suitable heterocycles of the formula (III) as well as of suitable amines on which the diazonium salts (IV) are based, is described in French Pat. specification No. 1,214,896.

However, the quaternization of the dye bases (II) proceeds incompletely and with unsatisfactory yields if dye bases and alkylating agents are used in a technically pure form. When the reaction mixtures of the quaternization are worked up in the technically customary manner via the aqueous phase with acid reaction, the unreacted portion of the dye bases (II) is protonated to form the dye salts (V). In comparison with the pure dyestuffs, the dyestuffs (I) which are contaminated with the dye salts (V) exhibit substantial disadvantages; they yield, for example, on materials of polyacrylonitrile duller dyeings with lesser fastness to light and sublimation. It is not advisable to deprotonate the dye salts (V) to give the water-insoluble dye bases (II) by a corresponding increase of the pH value, since the dyestuffs (I) form water-insoluble carbinol bases at only slightly increased pH values, which moreover decompose at temperatures of 60°C and above. The separation of the dye bases (II) which are generally strongly contaminated, and the decomposition reactions which partly occur already during quaternization, lead to the above-mentioned losses in yield.

It has now been bound that the quaternization of the dye bases (II) on the azo nitrogen linked with the radical A by means of quaternizing agents, preferably alkylating agents, in the presence of alkaline agents, proceeds almost completely and with very good yields when tertiary amines are used as alkaline agents which are space occupying-substituted on the nitrogen atom.

Space occupying-substituted tertiary amines, in the meaning of the invention, are tertiary amines which can not substantially be alkylated or not at all. In particular, those tertiary amines are of advantage in which the space occupying substitution is achieved by two substituents of the formula

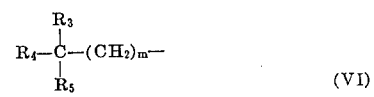

in which $m = 0$ or 1 end, in the base where $m$ is $= 1$, $R_3$ stands for an alkyl radical, $R_4$ for an alkyl radical or for a hydroxy group, and $R_5$ stands for hydrogen or for an alkyl radical and, in the case where $n$ is $= 0$, $R_3$ and $R_4$ stand for alkyl radicals, and $R_5$ stands for hydrogen. If $R_3$ and $R_4$ stand for alkyl radicals, then these radicals may also be a constituent of a carbocyclic ring system which may be substituted and which preferably consists of five or six ring members; $R_5$ then stands for hydrogen.

The third substituent of the above-mentioned preferred tertiary amines is an unbranched $C_1 - C_4$ alkyl radical, a β-hydroxy-propyl radical or a radical of the formulas

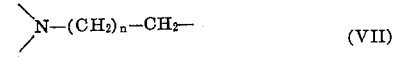

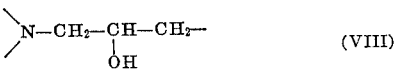

wherein $n$ is an integer from 1 – 5, and the free linkages of the nitrogen are occupied by substituents of the formula (VI).

Suitable tertiary amines of the above type which may be employed for the quaternization of the dye bases (II) are, for example, the following amines or mixtures thereof:

N-methyl- or N-ethyl- or N-n-propyl- or N-n-butyl-N,N-diisopropylamine, N-methyl- or N-ethyl- or N-n-propyl- or N-n-butyl-N,N-diisobutylamine, N-methyl- or N-ethyl- or N-n-propyl- or N-n-butyl-N-isopropyl-N-isobutylamine, N-methyl- or N-ethyl- or N-n-propyl- or N-n-butyl-N,N-bis-(2-methyl-butyl)-amine, N-methyl- or N-ethyl- or N-n-propyl- or N-n-butyl-N,N-bis-(2,2-dimethylpropyl)-amine, N-methyl- or N-ethyl- or N-n-propyl- or N-n-butyl-N,N-dicyclopentylamine, N-methyl- or N-ethyl- or N-n-propyl- or N-butyl-N,N-dicyclohexylamine, N,N,N-triisopropanolamine, N-2-hydroxypropyl-N,N-diisobutylamine, N-2-hydroxypropyl-N-isopropyl-N-isobutylamine, N-2-hydroxypropyl-bis-N,N-(2-methyl-butyl)-amine, N-2-hydroxypropyl-bis-N,N-(2,2-dimethylpropyl)-amine, N-2-hydroxypropyl-N,N-dicyclopentylamine, N-2-hydroxypropyl-N,n-dicyclohexylamine, N-isopropyl-N,N-bis-(2-hydroxypropyl)-amine, N-isobutyl-N,N-bis-(2-hydroxypropyl)-amine, N,N'-tetraisopropyl- and N,N'-tetraisobutyl-ethylenediamine, N,N'-diisopropyl-N,N'-diisobutyl-ethylenediamine, N,N'-tetra-(2-methyl-butyl)-ethylenediamine, N,N'-tetra-(2,2-dimethylpropyl)-ethylenediamine, N,N'-tetra-cyclopentyl-ethylenediamine, N,N'-tetra-cyclohexyl-ethylenediamine, N,N'-tetraisopropyl- and N,N'-tetraisobutyl-propylenediamine, N,N'-diisopropyl-N,N'-diisobutyl-propylenediamine, N,N'-tetra-(2-methyl-butyl)-propylenediamine, N,N'-tetra-(2,2-dimethylpropyl)-propylene-diamine, N,N'-tetra-cyclopentyl-propylenediamine, N,N'-tetra-cyclohexyl-propylenediamine, N,N'-tetraisopropyl- and N,N'-tetraisobutyl-butylenediamine, N,N'-diisopropyl-N,N'-diisobutyl-butylenediamine, N,N'-tetra-(2-methyl-butyl)-butylenediamine, N,N'-tetra-(2,2-dimethyl-propyl)-butylenediamine, N,N'-tetra-cyclopentyl-butylenediamine, N,N'-tetra-cyclohexyl-butylenediamine, N,N'-tetraisopropyl- and N,N'-tetraisobutyl-pentylenediamine, N,N'-diisopropyl-N,N'-diiso-butyl-pentylenediamine, N,N'-tetra-(2-methyl-butyl)-pentylenediamine, N,N'-tetra-(2,2-dimethylpropyl)-pentylenediamine, N,N'-tetra-cyclopentyl-pentylenediamine, N,N'-tetra-cyclohexyl-pentylene-diamine, N,N'-tetraisopropyl- and N,N'-tetraisobutyl-hexylene-diamine, N,N'-diisopropyl-N,N'-diisobutyl-hexylenediamine, N,N'-tetra-(2-methylbutyl)-hexylenediamine, N,N'-tetra-(2,2-dimethyl-propyl)-hexylenediamine, N,N'-tetra-cyclopentyl-hexylenediamine, N,N'-tetra-cyclohexyl-hexylenediamine, 1,3-bis-(diisopropylamino)-2-hydroxy-propane, 1,3-bis-(diisobutylamino)-2-hydroxy-propane, 1,3-bis-[di-(2-methyl-butyl)-amino]-2-hydroxy-propane, 1,3-bis-(dineopentylamino)-2-hydroxy-propane, 1,3-bis-(dicyclo-pentylamino)-2-hydroxy-propane, 1,3-bis-(dicyclohexylamino)-2-hydroxy-propane, 1,3-bis-[di-(2-hydroxypropyl)-amino]-2-hydroxy-propane.

The following heterocyclic amines may also be used as tertiary amines for the process according to the invention:
1-isopropyl-, 1-isobutyl- and 1-neopentyl-2-methyl-piperidine, 4-isopropyl-, 4-isobutyl- and 4-neopentyl-2,6-dimethyl-morpholine, 4-(2-hydroxypropyl)-2,6-dimethyl-morpholine, 1,4-bis-(2-hydroxypropyl)-2,5-dimethyl-piperazine, 1,4-bis-(isopropyl)-, 1,4-bis-(isobutyl)-and 1,4-bis-(neopentyl)-2,5-dimethyl-piperazine, 1,3-bis-[2-methyl-piperidino-(1)]-2-hydroxy-propane, 1,3-bis-[2,6-dimethyl-morpholino-(4)]-2-hydroxy-propane, 1,2-bis-[4-isopropyl-2,5-dimethyl-piperazino(1)]-2-hydroxy-propane, 1,2-bis-[4-isobutyl-2,5-dimethyl-piperazino-(1)]-2-hydroxy-propane, 1,2-bis-[4-neopentyl-2,5-dimethyl-piperazino-(1)]-2-hydroxy-propane, 1,2-bis-[4-(2-hydroxy-propyl)-2,5-dimethyl-piperazino-(1)]-2-hydroxy-propane.

The following amines or mixtures thereof are preferably suitable for the quaternization of the dye bases (II) according to the invention:
N-methyl- or N-ethyl- or N-n-propyl-N,N-diisopropylamine, N-n-propyl- or N-n-butyl-N,N-diisobutylamine, N-methyl- or N-ethyl-N,N-dicyclohexylamine, N,N,N-triisopropanolamine, N,N-diisobutyl-N-(2-hydroxypropyl)-amine, N-isobutyl- or N-isopropyl-N,N-bis-(2-hydroxy-propyl)-amine, N,N'-tetraisopropyl-ethylene-diamine, 1,3-bis-(diisopropylamino)-2-hydroxy-propane, 1,3-bis-[di-(2-hydroxy-propyl)-amino]-2-hydroxy-propane, 1-isopropyl-2-methyl-piperidine, 4-isopropyl-2,6-dimethyl-morpholine, 4-(2-hydroxypropyl)-2,6-dimethyl-morpholine, 1,4-bis-(2-hydroxy-propyl)-2,5-dimethylpiperazine, 1,3-bis-[2,6-dimethyl-morpholino-(4)]-2-hydroxy-propane, 1,2-bis-[4-isopropyl-2,5-dimethyl-piperazino-(1)]-2-hydroxy-propane.

Of the above amines, the triisopropanolamine is especially to be mentioned since it substantially increases the solubility of the dye bases (II) and particularly that of the quaternary dyestuffs (I) in the alkylating medium so that the amount of solvent can be decreased.

The tertiary amines used as alkaline agents are added in an amount of 5 – 50, preferably 15 – 25 mol percent, referred to the dye base (II) to be quaternized.

In German Published Pat. specification No. 1,132,135 it has been described that tertiary amines of the type to be used according to the invention can be used, due to their acid-binding action, as auxiliaries for the alkylation of primary amines to give tertiary amines and for dehydrohalogenation reactions. In contradiction thereto, the quaternization reactions, such as those according to the invention, proceed with the addition of the alkylating agent on to the compound to be quaternized, and thus, fundamentally, not with the splitting off of protons. It is therefore a surprising and novel fact that the degree of the reaction and the yield of the quaternization of the dye bases (II) to give the dyestuffs (I) are increased in the presence of the above-mentioned tertiary amines. Rather the opposite was to be expected, viz. that the high basicity of the amines to be used according to the invention would lead to the decomposition of the dyestuffs (I), as already mentioned above, via their carbinol bases. The high basicity of these amines is characterized in that the pK value determined potentiometrically in a water-containing glycol monomethyl ether against perchloric acid by means of a glass electrode calibrated in aqueous media lies above 5.5; (cf. S Hunig and M. Kiessel, J. prakt. Chemie [4], 5, 224 [1958]).

In German Pat. specification No. 1,205,638 the production has been disclosed of dyestuffs of the general formula (IX)

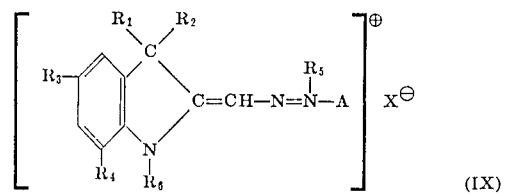

(IX)

in which A represents the radical of an aromatic amine of the benzene or naphthalene series, X is an anion, $R_1$ and $R_2$ represent short-chain alkyl radicals which are identical or different or linked with one another, $R_3$ and $R_4$ denote hydrogen atoms or non-ionic substituents, and $R_5$ and $R_6$ represent alkyl radicals.
by treating dye bases of the general tautomeric formula (X)

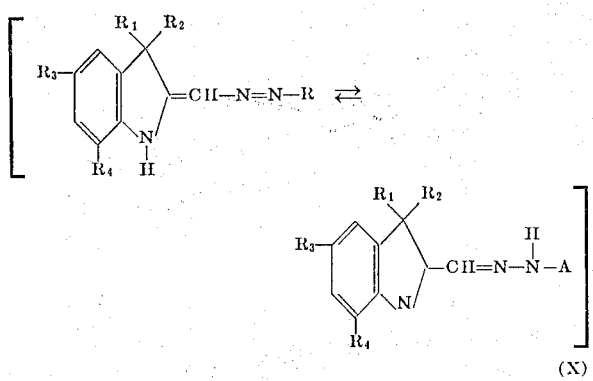

in which A, $R_1$, $R_2$, $R_3$ and $R_4$ have the meaning indicated for (IX),
with alkylating agents in the presence of acid-binding agents. Acid-binding agents are sodium hydrogen carbonate, potassium carbonate, sodium hydroxide, magnesium oxide, zinc oxide or calcium carbonate, the use of magnesium oxide being preferred in the working Examples.

According to the process of German Pat. specification No. 1,205,638, two alkyl groups are introduced stepwise into the dyestuff molecule (IX). At first, the alkylation of a secondary amine nitrogen takes place to give a tertiary amine nitrogen. For the equivalent acid liberated in this operation according to experience, viz. in this step only, the acid-binding agent is required. The quaternization reaction following in a second step proceeds with the addition of an alkyl group on to the compound to be quaternized, no protons being liberated in this process, so that for this second process step fundamentally no acid-binding agent is required according to the knowledge derived from the teachings of German Pat. specification No. 1,205,638. The fact that in this process acid-binding agents are present also in the second step, i.e., in the quaternization reaction, has its only reason in that the acid-binding agent required in the first step was not removed and the reaction completed in one single process step. It can therefore not be concluded from German Pat. specification No. 1,205,638 that the quaternization of the dye bases (II) in the presence of acid-binding agents would be a technical advantage. On this large scale this would, in fact, not be the case. It is, therefore, extremely surprising that the quaternization of the dye bases (II) leads to particularly advantageous results upon the addition of very special alkaline agents, viz. tertiary amines which are space occupying substituted on the nitrogen atom.

The quaternization according to the invention enables the dyestuffs (I) to be obtained with a higher degree of purity than could previously be achieved by additional purification and separation operations according to the known quaternization process.

A particularly preferred embodiment of the present invention consists in that the dye bases (II) are reacted at 50° – 90°C, preferably at 60° – 85°C, in a water-immiscible organic, aprotic solvent, such as benzene, toluene, xylene and halogenated derivatives thereof, especially chlorobenzene, as well as anisole and chloroform, in the presence of 5 – 50, preferably 15 – 25 mol percent (referred to the dye base) triisopropanolamine with an excess of dimethyl sulphate. The excess of dimethyl sulphate is so measured that the reaction mixture has an acid reaction upon the addition of water. The quaternary dyestuff is isolated in known manner, for example, by steam distillation and cooling of the aqueous solution, optionally with the addition of inorganic salts decreasing the solubility.

In the following Examples the parts by weight and the parts by volume are in the ratio of kilogram to liter.

EXAMPLE 1

61.7 Parts by weight p-anisidine are introduced at 58°C into a mixture of 155 parts by volume hydrochloric acid (19.5 Be) and 250 parts by volume water, and the suspension of the hydrochloride is diazotized at 0° – 3°C with a solution of 35.1 parts by weight sodium nitrite in 100 parts volume of water. The excess of nitrite is destroyed with urea or amidosulphonic acid, and the diazo solution mixed at 5°C with 86.7 parts by weight 1,3,3-trimethyl-2-methylene-indolenine. Coupling is effected by the addition of 400 parts by volume of an aqueous solution containing 200 g sodium acetate per liter. The coupling product is transformed into the dye base by the addition of 440 parts by volume of a 2.5N caustic soda solution. Heating is continued for some time at 60°C, the product is then filtered off with suction, the electrolytes are washed out with water, and the product is dried at 70°C in a vacuum until the weight is constant. 155 Parts by weight of the anhydrous dye base of the formula

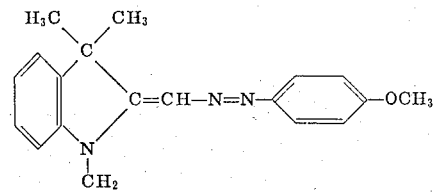

are obtained. 120 Parts by weight of this dye base are dissolved in 1000 parts by volume anhydrous chloroform, and 10 parts by weight N-ethyl-N,N-diisopropylamine are admixed. 50 Parts By volume of pure dimethyl sulphate are added at 50° – 55°C, and the mixture is kept at 55° – 60°C for a further 10 hours. The solvent is then distilled off with seam, the mixture is made up with water to 1000 parts by volume, and the dyestuff salted out with 85 parts by weight sodium chloride. The suspension is allowed to cool to 20°C and the precipitated dyestuff is filtered off with suction, washed with a 10 percent sodium chloride solution, which is adjusted to pH 1 with a little hydrochloric acid, to remove the mother liquor, and the product is dried at 60°C in a vacuum. 160 Parts by weight of the dyestuff of the formula

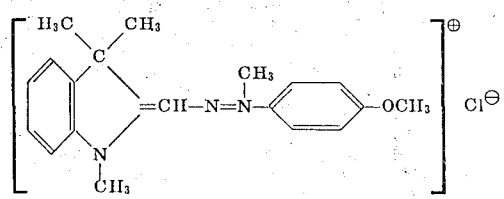

are obtained. The dyestuff dyes materials of polyacrylonitrile in golden yellow shades. Only traces of the nonmethylated starting material can be detected in the film chromatogram.

When in this Example the chloroform is replaced by equal amounts of benzene, toluene, xylene, chlorobenzene, o-dichlorobenzene or anisole, the dyestuff is obtained in approximately the same yield.

When the procedure is followed as described in the preceding Example, but replacing the p-anisidine there used as diazo component and the 1,3,3-trimethyl-2-methylene-indoline used as coupling component by equivalent amounts of the components set out in the Table below, dyestuffs are obtained which correspond to the above formula and which dye materials of polyacrylonitrile in the specified shades:

| Diazo component | Coupling component | Shade of the quaternary dyestuff on polyacrylonitrile |
|---|---|---|
| 1-amino-4-methyl-benzene | 1,3,3-trimethyl-2-methylene-indoline | yellow |
| 1-amino-4-chlorobenzene | " | reddish yellow |
| 1-amino-2-methoxy-benzene | " | greenish yellow |
| 4-aminodiphenyl ether | " | golden yellow |
| 4-aminoazobenzene | " | orange |
| 2-(4'-aminophenyl)-6-methyl-benzthiazole | " | reddish yellow |
| 2-aminoaphthalene | " | golden yellow |
| aminobenzene | 1,3,3-trimethyl-5-methoxy-2-methylene-indoline | reddish yellow |
| 1-amino-4-methoxy-benzene | " | yellowish orange |
| 1-amino-4-methyl-benzene | 1,3,3-trimethyl-5-chloro-2-methylene-indoline | yellow |
| 1-amino-4-methoxy-benzene | 1,3,3-trimethyl-5-nitro-2-methylene-indoline | orange |
| 1-amino-4-methyl-benzene | 1,3,4-trimethyl-6-methylene-dihydropyrimidone-2 | reddish yellow |
| 1-amino-4-methoxy-benzene | " | yellowish orange |
| 1-amino-4-chloro-benzene | " | yellowish orange |
| 4-aminoazobenzene | " | orange |

EXAMPLE 2

53.7 Parts by weight p-toluidine are diazotized in conventional manner in dilute hydrochloric acid and coupled in an acetate-buffered medium with 86.7 parts by weight 1,3,3-trimethyl-2-methylene-indoline. The coupling product is converted into the dye base with a dilute caustic soda solution without intermediate isolation. The dye base is washed with hot water until neutral and dried at 60°C is a vacuum. 144 Parts by weight of the anhydrous dye base

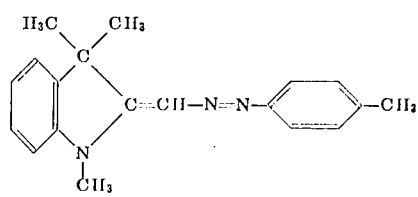

are obtained.

120 Parts by weight of this dye base are dissolved in 175 parts by volume of anhydrous chlorobenzene while heating. 16.0 Parts by weight anhydrous triisopropanolamine are added and the mixture is heated to 80° – 85°C. At this temperature there are added, while cooling, 52.8 parts by volume dimethyl sulphate and the mixture is kept at 80° – 85°C for a further 10 hours. The excess of dimethyl sulphate is then hydrolized with water, the chlorobenzene distilled off with steam, the mixture made up with water to 1000 parts by volume, and the dyestuff is salted out with 85 parts by weight sodium chloride. The suspension is allowed to cool to 20°C, the dyestuff is filtered off with suction, washed with a 10 percent sodium chloride solution to remove the mother liquor and the product is dried at 60°C in a vacuum. 156 Parts by weight of the quaternary dyestuff of the formula

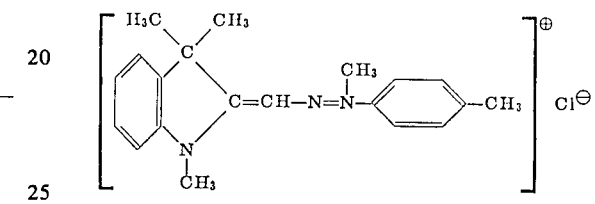

are obtained.

Only traces of the non-methylated starting material can be detected in the film chromatogram.

When the procedure is followed as described in the preceding Example, but the p-toluidine there used as diazo component and the 1,3,3-trimethyl-2-methylene-indoline used as coupling component are replaced by equivalent amounts of the components set out in the Table below, dyestuffs are obtained which correspond to the above formula and which dye materials of polyacrylonitrile in the specified shades.

| Diazo component | Coupling component | Shade of the quaternary dyestuff on polyacrylonitrile |
|---|---|---|
| 1-amino-3,4-dimethyl-benzene | 1,3,3-trimethyl-2-methylene-indoline | reddish yellow |
| 1-amino-4-chloro-benzene | " | reddish yellow |
| 1-amino-2-methoxy-benzene | " | greenish yellow |
| 1-amino-2-methoxy-4-methylbenzene | " | yellow |
| 1-amino-2-methoxy-5-methylbenzene | 1,3,3-trimethyl-2-methylene-indoline | yellow |
| 1-amino-2-methoxy-4-chlorobenzene | " | reddish yellow |
| 1-amino-2-methoxy-5-chlorobenzene | " | greenish yellow |
| 1-amino-4-methoxybenzene | " | golden yellow |
| 1-amino-3-chloro-4-methoxybenzene | " | golden yellow |
| 1-amino-2,4-dimethoxy-benzene | " | golden yellow |
| 1-amino-2,5-dimethoxy-benzene | " | reddish yellow |
| 4-aminodiphenyl ether | " | golden yellow |
| 2-aminodiphenyl ether | " | greenish yellow |
| 4-aminoazobenzene | " | yellowish orange |
| 1-amino-4-acetyl-aminobenzene | " | orange |
| 4-amino-2-ethoxy-diphenylamine | " | red-brown |
| 1-aminobenzene-4-carboxylic acid ethyl ester | " | greenish yellow |
| 2-(4'-aminophenyl)-6-methyl-benzthiazole | " | yellowish orange |
| 2-aminonaphthalene | " | golden yellow |
| 1-amino-4-methyl-benzene | 1,3,3-trimethyl-5-nitro-2-methylene- | yellowish orange |

| | | |
|---|---|---|
| 1-amino-4-methoxy-benzene | indoline " | orange |
| 1-amino-4-methyl-benzene | 1,3,3-trimethyl-5-chloro-2-methylene-indoline | yellow |
| 1-amino-4-methoxy-benzene | 1,3,3-trimethyl-7-chloro-2-methylene-indoline | yellowish orange |
| 1-amino-4-methoxy-benzene | 1,3,3-trimethyl-2-methylene-indoline 5-carboxylic acid methyl ester | orange |
| 2',3-dimethyl-4-aminoazobenzene | 1,3,3-trimethyl-2-methylene-indoline 5-carboxylic acid methyl ester | reddish orange |
| 1-amino-4-methoxy-benzene | 1-ethyl-3,3-dimethyl-benzo-(6,7)-2-methylene-indoline | reddish orange |
| 1-amino-4-methyl-benzene | 1-dimethylamino-3-methyl-3-phenyl-2-methylene-indoline | reddish yellow |
| 1-amino-4-methyl-benzene | 1,3,4-trimethyl-6-methylene-dihydro pyrimidone-2 | reddish yellow |
| 1-amino-4-methoxy-benzene | " | yellowish orange |
| 4-aminoazobenzene | " | orange |
| 2-aminonaphthalene | " | yellowish orange |
| aminobenzene | 1,3,3,5-tetramethyl-2-methylene-indoline | yellow |
| 1-amino-4-methoxy-benzene | " | golden yellow |
| 1-amino-4-ethoxy-benzene | " | golden yellow |
| 1-amino-3-chloro-4-methoxybenzene | " | yellowish orange |
| aminobenzene | 1,3,3-trimethyl-5-methoxy-2-methylene-indoline | reddish yellow |
| 1-amino-4-methoxy-benzene | " | yellowish orange |
| 1-amino-2,4-dimethoxy-benzene | " | yellowish orange |
| 4-aminoazobenzene | " | orange |

EXAMPLE 3

120 Parts by weight of the anhydrous dye base of the formula

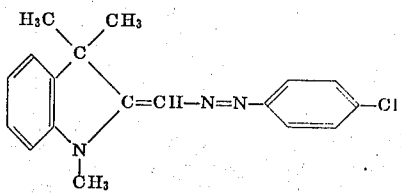

prepared in the usual manner from p-chloroaniline and 1,3,3-trimethyl-2-methylene-indoline, are dissolved in 500 parts by volume anhydrous chlorobenzene and admixed with 12.4 parts by weight 1,3-bis-[di-(2-hydroxy-proxy)-amino]-2-hydroxypropane. 47.5 Parts by volume dimethyl sulphate are added at 70°C and the mixture is kept at 70°C for a further 8 hours. The chlorobenzene is then distilled off with steam, the aqueous dyestuff solution made up to 2000 parts by volume and the dyestuff precipitated by cooling the solution to 0°C. The dyestuff is filtered off with suction, washed with a 2 percent sodium chloride solution at 0°C to remove the mother liquor, and dried at 60°C in a vacuum. There are obtained 170 parts by weight of the dyestuff of the formula

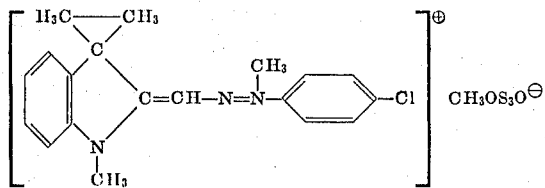

The dyestuff is obtained in the same yield when the 1,3-bis-[di-(2hydroxy-propyl)-amino]-2-hydroxy-propane is replaced by equivalent amounts of the following tertiary amines: methyl-, ethyl- and p-propyl-diisopropyl-amine, n-propyl- and n-butyl-diisobutylamine, methyl- and ethyl-dicyclohexylamine, triisopropanolamine, diisobutyl-(2-hydroxypropyl)-amine, isobutyl- and isopropyl-bis-(2-hydroxypropyl)-amine, N,N'-tetraisopropyl-ethylene-diamine, 1,3-bis-(diisopropylamino)-2-hydroxy-propane, 1,3-bis-[di-(2-hydroxy-propyl)-amino]-2-hydroxy-propane, 1-isopropyl-2-methyl-piperidine, 4-isopropyl-2,6-dimethyl-morpholine, 4-(2-hydroxy-propyl)-2,6-dimethyl-morpholine, 1,4-bis-(2-hydroxypropyl)-2,5-dimethylpiperazine, 1,3-bis-[2,6-dimethyl-morpholino-(4)]-2-hydroxy-propane, 1,2-bis-[4-isopropyl-2,5-dimethyl-piperazino-(1)]-2-hydroxy-propane.

We claim:

1. Process for the production of basic dyestuff of the formula

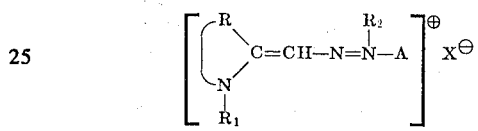

in which R represents the residual constituent of a 5- or 6-membered heterocyclic ring, $R_1$ denotes alkyl cycloalkyl, aralkyl or aryl, $R_2$ denotes alkyl, cycloalkyl or alalkyl, A is a radical of the benzene or naphthalene series, and X is an anion, by quaternizing dye bases of the formula

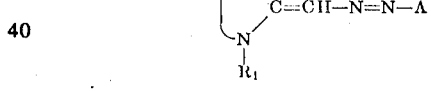

in which R, $R_1$ and A have the same meaning, as above, at the azo nitrogen linked to A, with quaternizing agents wherein the quaternizing takes place in the presence of alkaline agents, said alkaline agents being tertiary amines selected from the group consisting of A. one wherein one substituent is selected from the group consisting of unbranched $C_{1-4}$ alkyl, β-hydroxy propyl,

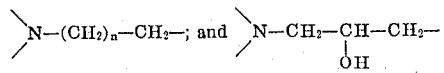

where n is 1–5 and the free N-valences contain, along with the other two substituents on the tertiary amine, substituents of the formula

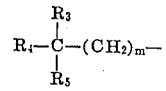

where m is 0 or 1 and when m is 1, $R_3$ is alkyl with one to two carbon atoms;
$R_4$ is alkyl with one to two carbon atoms or OH;
$R_5$ is alkyl with one to two carbon atoms or H; and
when $m$ is 0,
$R_3$ is alkyl with one to two carbon atoms;
$R_4$ is alkyl with one to two carbon atoms;
$R_5$ is H;
and whenever $R_5$ is H, $R_3$ and $R_4$ can be a single substituent forming with the substituted carbon a member of the class cyclopentyl and cyclohexyl; and one of the heterocyclic tertiary amines of the class 1-isopropyl-, 1-isobutyl- and 1-neopentyl-2-methyl-piperidine, 4-isopropyl-, 4-isobutyl- and 4-neopentyl- 2,6-dimethyl-morpholine, 4-(2-hydroxypropyl)-2,6-dimethyl-morpholine, 1,4-bis-(2-hydroxypropyl)-2,5-dimethyl-piperazine, 1,4-bis-(isopropyl)-; 1,4-bis-(isobutyl)-and 1,4-bis-(neopentyl)-2,5-dimethyl-piperazine, 1,3-bis-[2-methyl-piperidino-(1)]-2-hydroxy-propane; 1,3-bis[2,6-dimethyl-morpholino-(4)]-2-hydroxy-propane, 1,2-bis-[4-isopropyl-2,5-dimethyl-piperazino(1)]2-hydroxy-propane, 1,2-bis-[4-isobutyl-2,5-dimethyl-piperazino-(1)]-2-hydroxy-propane, 1,2-bis-[4-neopentyl-2,5-dimethyl-piperazino-(1)]-2-hydroxy-propane, 1,2-bis-[4-(2-hydroxy-propyl)-2,5-dimethyl-piperazino-(1)]-2-hydroxy-propane.

2. Process according to claim 1, characterized by using heterocyclic amines as substituted tertiary amines.

3. Processes according to claim 1, characterized by adding triisopropanolamine as tertiary amine.

4. Processes according to claim 1, characterized by adding the triisopropanolamine in an amount of 5 – 50 mol percent, referred to the dye base to be quaternized.

5. Process of claim 1 wherein the basic dyestuff is one of the formula

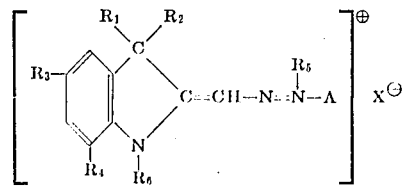

where A is a radical of the benzene or naphthalene series;
X is an anion;
$R_1$ and $R_2$ are short-chain alkyl or together for two linked short-chain alkyls; $R_3$ and $R_4$ are H or non-ionic substituents; and
$R_5$ and $R_6$ are alkyl.

* * * * *

UNITED STATES PATENT OFFICE
CERTIFICATE OF CORRECTION

Patent No. 3,718,642                    Dated February 27, 1973

Inventor(s) Klaus-Friedrich, et al

It is certified that error appears in the above-identified patent and that said Letters Patent are hereby corrected as shown below:

Column 2, line 12, "bound" should read ---found---.

Column 2, line 32, "end" should read ---and---.

Column 2, line 32 "base" should read ---case---.

Column 2, line 35, "n" should read ---m---.

Column 3, line 2, "Noethyl-" should read ---N-ethyl---.

Column 4, line 21, "1,2-bis" should read ---1,3-bis---.

Column 5, line 13 in the left formula, "-R" should read -----A ---.

Column 5, line 20, in the right formula, " \N/ " should

Column 6, line 50, "By" should read ---by---.

Column 6, line 53, "seam" should read ---steam---.

Signed and sealed this 3rd day of December 1974.

(SEAL)
Attest:

McCOY M. GIBSON JR.              C. MARSHALL DANN
Attesting Officer                Commissioner of Patents